(12) United States Patent
Ramalingam et al.

(10) Patent No.: US 8,311,285 B2
(45) Date of Patent: *Nov. 13, 2012

(54) METHOD AND SYSTEM FOR LOCALIZING IN URBAN ENVIRONMENTS FROM OMNI-DIRECTION SKYLINE IMAGES

(75) Inventors: Srikumar Ramalingam, Cambridge, MA (US); Matthew E. Brand, Newtonville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/824,296

(22) Filed: Jun. 28, 2010

(65) Prior Publication Data

US 2011/0150320 A1  Jun. 23, 2011

Related U.S. Application Data

(63) Continuation-in-part of application No. 12/495,655, filed on Jun. 30, 2009, now Pat. No. 8,249,302.

(51) Int. Cl.
G06K 9/00 (2006.01)
(52) U.S. Cl. .................................. 382/104; 382/154
(58) Field of Classification Search .................. None
See application file for complete search history.

(56) References Cited

U.S. PATENT DOCUMENTS

| 6,973,212 | B2 | 12/2005 | Boykov | |
|---|---|---|---|---|
| 2006/0177101 | A1* | 8/2006 | Kato et al. | 382/106 |
| 2008/0075357 | A1* | 3/2008 | Yoon et al. | 382/153 |
| 2008/0232678 | A1* | 9/2008 | Yoon et al. | 382/153 |
| 2011/0035054 | A1* | 2/2011 | Gal et al. | 700/258 |

OTHER PUBLICATIONS

Jun-ichi Meguro et al., Development of Positioning Technique using Omni-directional IR Camera and Aerial Survey Data, Advanced Intelligent Mechatronics, 2007, 6 pages.*

* cited by examiner

Primary Examiner — Brian P Werner
(74) Attorney, Agent, or Firm — Dirk Brinkman; Gene Vinokur

(57) ABSTRACT

A location and orientation in an environment is determined by acquiring a set of one or more real omni-directional images of an unknown skyline in the environment from an unknown location and an unknown orientation in the environment by an omni-directional camera. A set of virtual omni-directional images is synthesized from a 3D model of the environment, wherein each virtual omni-directional image is associated with a known skyline, a known location and a known orientation. Each real omni-directional image is compared with the set of virtual omni-directional images to determine a best matching virtual omni-directional image with the associated known location and known orientation that correspond to the unknown location and orientation.

15 Claims, 8 Drawing Sheets

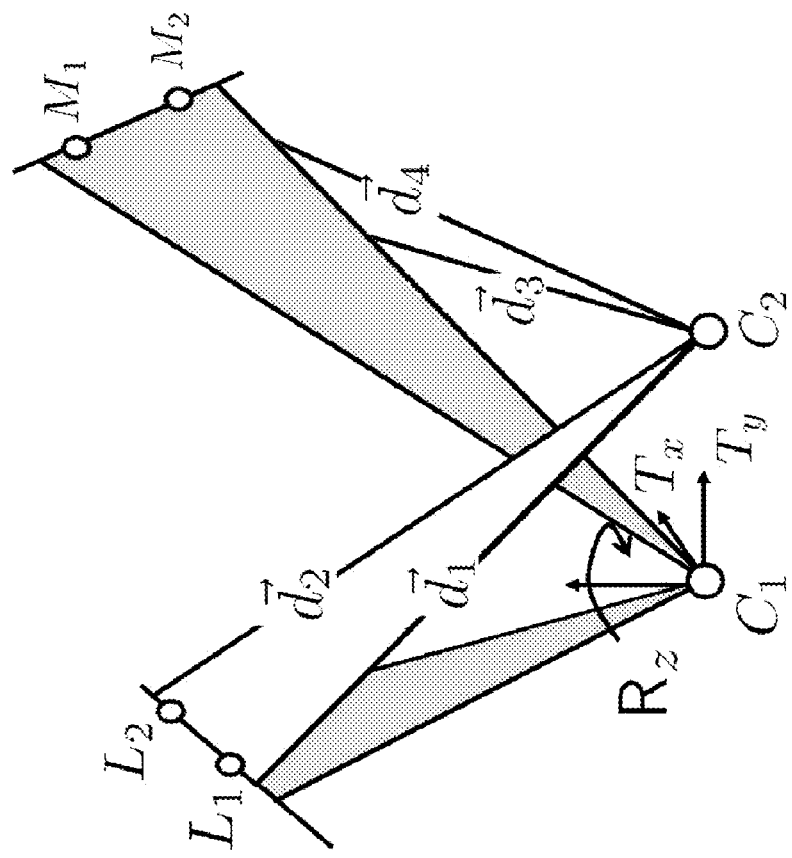
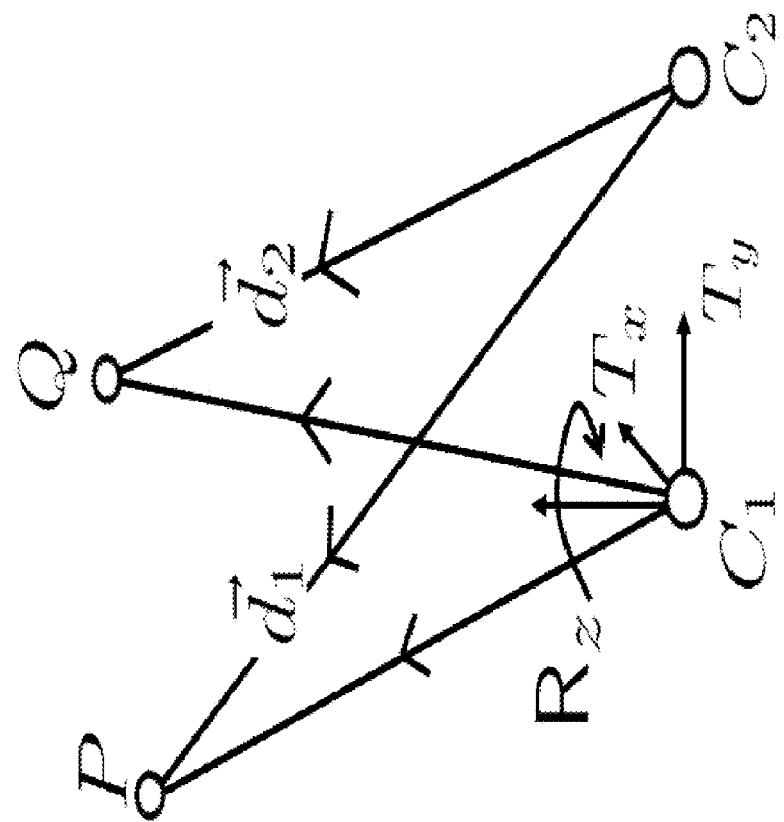
*Fig. 7B*
*Fig. 7A*

METHOD AND SYSTEM FOR LOCALIZING IN URBAN ENVIRONMENTS FROM OMNI-DIRECTION SKYLINE IMAGES

RELATED APPLICATIONS

This is a continuation-in-part of U.S. application Ser. No. 12/495,655, "Method for Determining a Location From Images Acquired of an Environment with an Omni-Directional Camera," filed Jun. 30, 2009, now U.S. Pat. No. 8,249, 302 by Ramalingam et al., incorporated herein by reference. This application is also related to U.S. application Ser. No. 12/824,329, "Method for Registering 3D Points with 3D Planes," filed Jun. 28, 2010 and U.S. application Ser. No. 12/824,828, "Method for Determining 3D Poses Using Points And Lines," filed Jun. 28, 2010, by Ramalingam et al. co-filed herewith.

FIELD OF THE INVENTION

This invention is generally related to localizing, and more particular to localizing in urban environment using skylines.

BACKGROUND OF THE INVENTION

An omni-direction image (omni-images) that acquire a skyline of an urban environment by an omni-directional camera (omni-camera) can be used for geo-localization. As an advantage, the representation of the skyline can be compact, is unique, and remarkably informative about a location. The skyline is also less prone to occlusions by trees, lampposts, vehicles, pedestrians, and lighting variations in other visual features. Of particular interest are urban skylines.

The main reason to use omni-images instead of perspective images comes from the fact that the stability of the underlying pose estimation problem increases with the field of view of the camera. Omni-images also can give much better accuracy in motion estimation than conventional perspective images. In the case of small rigid motions, two different motions can yield nearly identical motion fields for conventional images, which is not the case for omni-images.

The basic conventional method matches a query image of an unknown location with database images of known locations. In order to match the query image with a large collection of images features based on color histograms, texton, histograms, line features, gist descriptor, and geometric context can be used.

Some methods can match lines in 3D models with lines in the images. Such geometry-matching methods are generally efficient but have very high sensitivity to imperfections in a feature extraction pipeline.

It is often desired to determine one's location, for example when driving. One way to do this is to use a global positioning system (GPS). Unfortunately, GPS has limitations because the signals are broadcasted at 500 Watts from satellites about 12,000 miles up. Signals from four satellites are required for normal operation. The signals can be obstructed by buildings, and even foliage. This is called the urban canyon problem where radio reception is poor.

Therefore, it is desired to use computer vision techniques. In computer vision applications, images are analyzed to determine poses, i.e., location and orientation. Pose estimation, although extremely challenging due to several degeneracy problems and inaccurate feature matching, is well known in computer vision. However, most conventional solutions are only proven on a small scale, typically in a well controlled environment.

One system uses an infrared camera and a 3D model generated from an aerial laser survey. That system requires an expensive infrared camera, which makes it impractical for large-scale deployment in consumer oriented applications, such as vehicle or hand-held devices. The camera in that system has a restricted field of view. To provide a partial 360° view primary and secondary mirrors are placed directly in the optical path between the scene and camera. The mirrors obscure a large central portion of the infrared images.

Another method is described in U.S. application Ser. No. 12/495,655, "Method for Determining a Location From Images Acquired of an Environment with an Omni-Directional Camera," filed Jul. 22, 2009 by Ramalingam et al.

SUMMARY OF THE INVENTION

The embodiments of the invention provide a system and method for determining a 6D pose (3D location and 3D orientation) in an environment from a sequence of 2D images acquired of the environment by an omni-directional camera. The camera is oriented vertically upward to acquire images of, for example, a skyline in an urban environment. The method accurately compares the 2D images with a 3D model of the environment using graph cuts for easy conditions, and shortest path for difficult night-time cases.

BRIEF DESCRIPTION OF THE DRAWINGS

FIG. 7 is a schematic of the minimal pose estimation algorithm using two features according to embodiments of the invention.

DETAILED DESCRIPTION OF THE PREFERRED EMBODIMENTS

System and Method Overview

Figure 8:
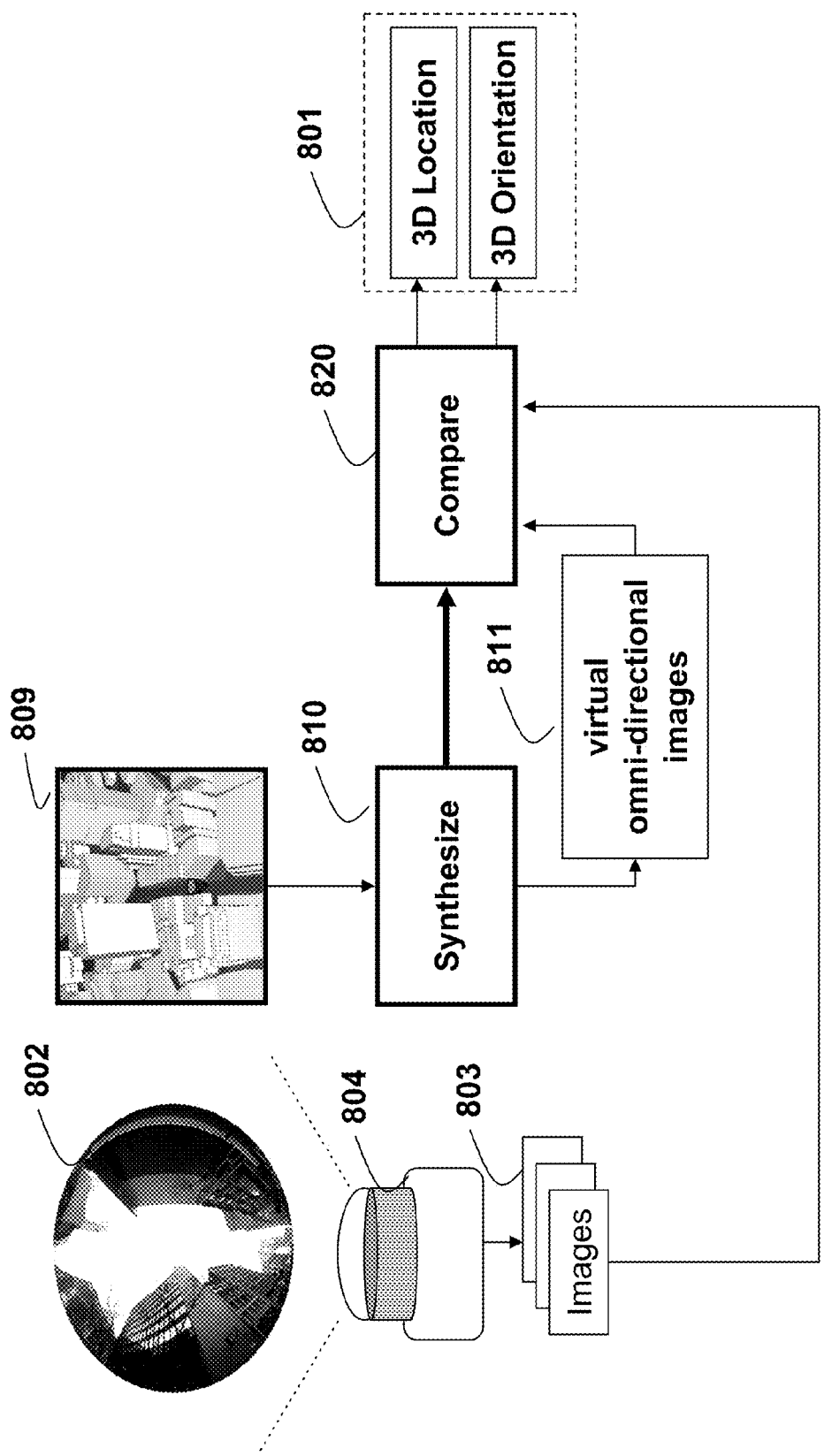
FIG. 8 is a flow diagram of a method for determining poses in an environment according to embodiments of the invention.

As shown in FIG. 8, the embodiments of our invention provide a system and method for determining a 6D pose 801 (3D location and 3D orientation) in an environment 802 from a set of one or more of omni-directional images (omni-images) 803 acquired of the environment with an omni-directional camera (omni-camera) 804.

A set of virtual omni-directional images 811 is synthesized 810 from a 3D model 809 of the environment. Each virtual omni-directional image is associated with a known skyline, a known location and a known orientation.

Each real omni-directional image is compared 820 with the set of virtual omni-directional images 811 to determine a best matching virtual omni-directional image with the associated known location and known orientation that correspond to the unknown location and orientation. The above steps can be performed in a processor connected to a memory and input/output interfaces as known in the art.

If the camera is mobile, the system and method can be used for navigating through the environment, and geo-localization.

We use a "universal" calibration, which treats the problem as an arbitrary mapping between image pixels and corresponding projection rays from the environment. We are not aware of any work in computer vision, which synthesizes 2D omni-images from 3D models for the purpose of 6D pose estimation. The synthesis is done using a pixel shader program implemented on a graphics processing unit (GPU) for generating a large number of omni-images in real time. Hence, our method does not require a database of pre-stored for the matching.

Sky Detection Using Graph Cuts

We use graph cuts and embedded parameter learning for accurately detecting the sky in omni-images. Our graph cuts are based on the well known Hoperoft-Karp algorithm, see U.S. Pat. No. 6,973,212, "Graph cuts for binary segmentation of n-dimensional images from object and background seeds." After detecting the sky, skyline matching is done using a chamfer distance embedded in a RANdom SAmple Consensus (RANSAC) framework.

A skyline detection method can be inaccurate in inclement weather conditions or occlusions. To handle difficult weather and lighting conditions, we use a max-min operator, and a shortest path procedure to determine the 6D pose.

This replaces the requirement of a sky-detection for geo-localization with a cost function, as in the prior art, that validates the various skyline proposals from the 3D models. To reduce the search space in skyline matching, coarse pose estimation is preformed using only two minimal matches, i.e., two points, two lines, one point and a line. This is done using two consecutive images with two feature correspondences on the skylines. We identify a minimal solution for six degree of freedom (6 DOF) pose estimation, in terms of how many features (points and lines) are acquired from the skyline analysis.

This procedure is used in reducing the search space while matching skylines. This also highlights the important connection of the 2D-3D registration problem to our skyline-matching, and clearly points out the possible degenerate cases and the rarity of such degenerate cases occurring in practical applications.

Calibration and Omni-Image Synthesis

We use a generic 3D imaging model to calibrate our camera. According to this model, every pixel in the omni-image is mapped to a 3D half-ray in space. A "ray-table" of this mapping can be determined using images of calibration grids. The use of generic imaging models enables very precise distortion correction.

Figure 1:
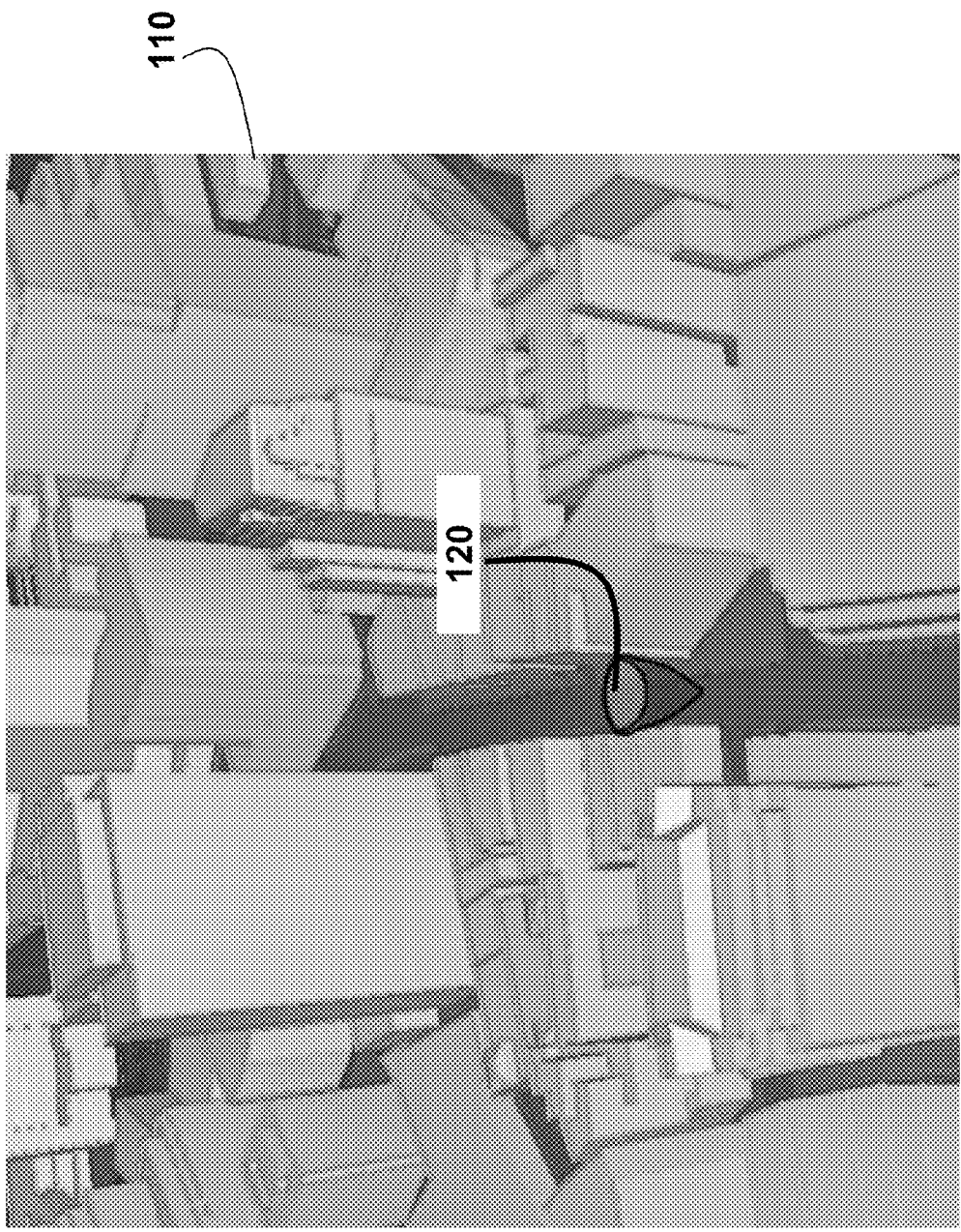
FIG. 1 is an image of a coarse 3D model without texture of an urban environment according to embodiments of the invention.
Figure 2:
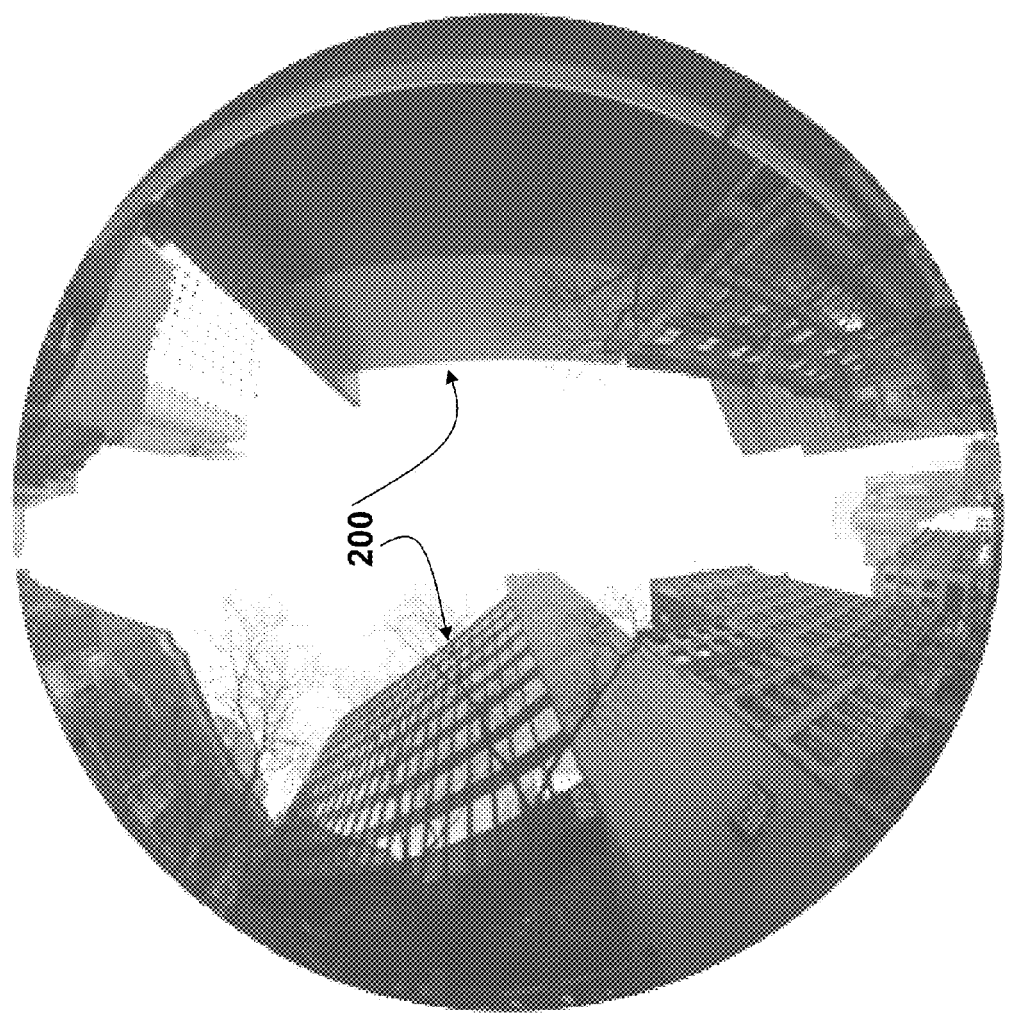
FIG. 2 is an image of a skyline of the urban environment as observed by a camera 120 according to embodiments of the invention.
Figure 3:
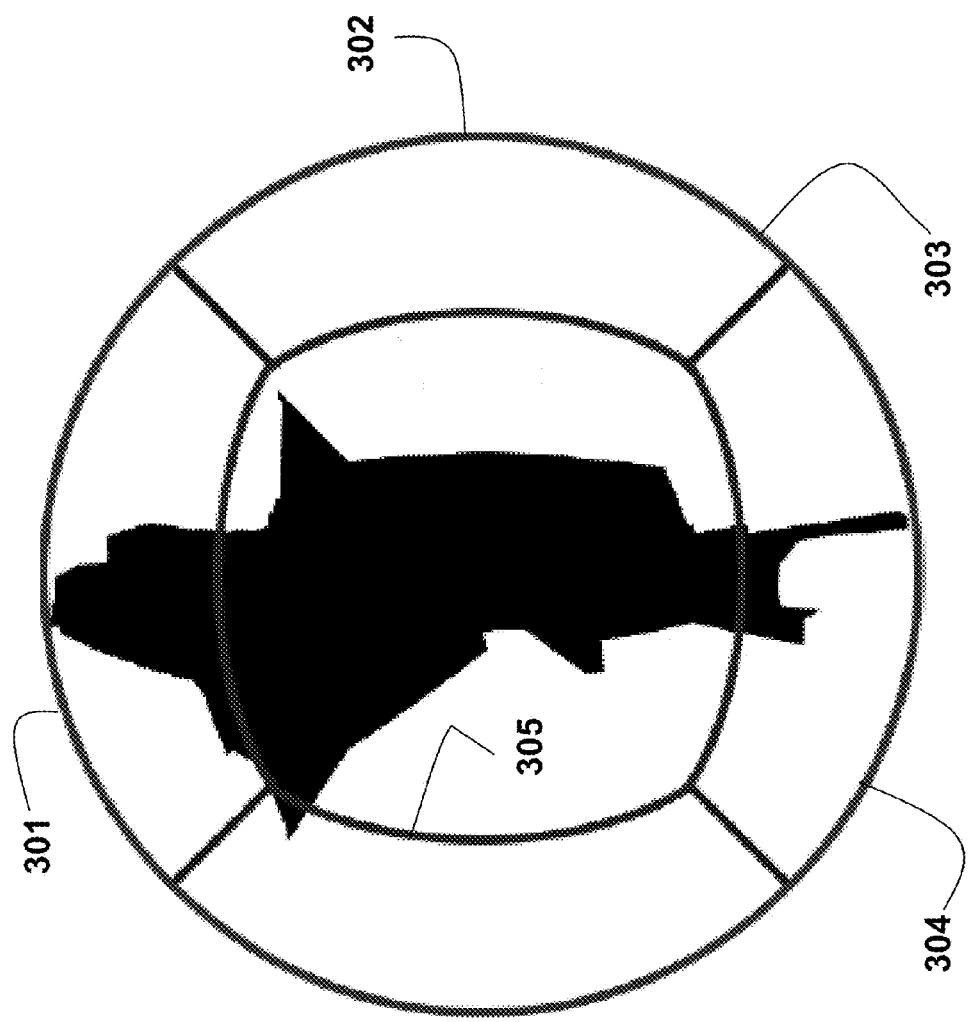
FIG. 3 is a composition of five corresponding binary perspective images used to synthesize an omni-directional skyline according to embodiments of the invention.

FIG. 1 is an image of a coarse 3D model 110 without texture of an urban environment. The figure also shows the location of a virtual omni-camera 120 according to embodiments of the invention;

FIG. 2 shows the skyline 200 observed by the camera 120 according to embodiments of the invention;

As shown in FIG. 3, we generate and composite five corresponding binary perspective views 301-305. Therefore, the perspective views contain simple unshaded renderings of entirely white 3D building shapes against a black sky. Then, we use a calibrated ray-table to map generate skyline images.

Figure 4:
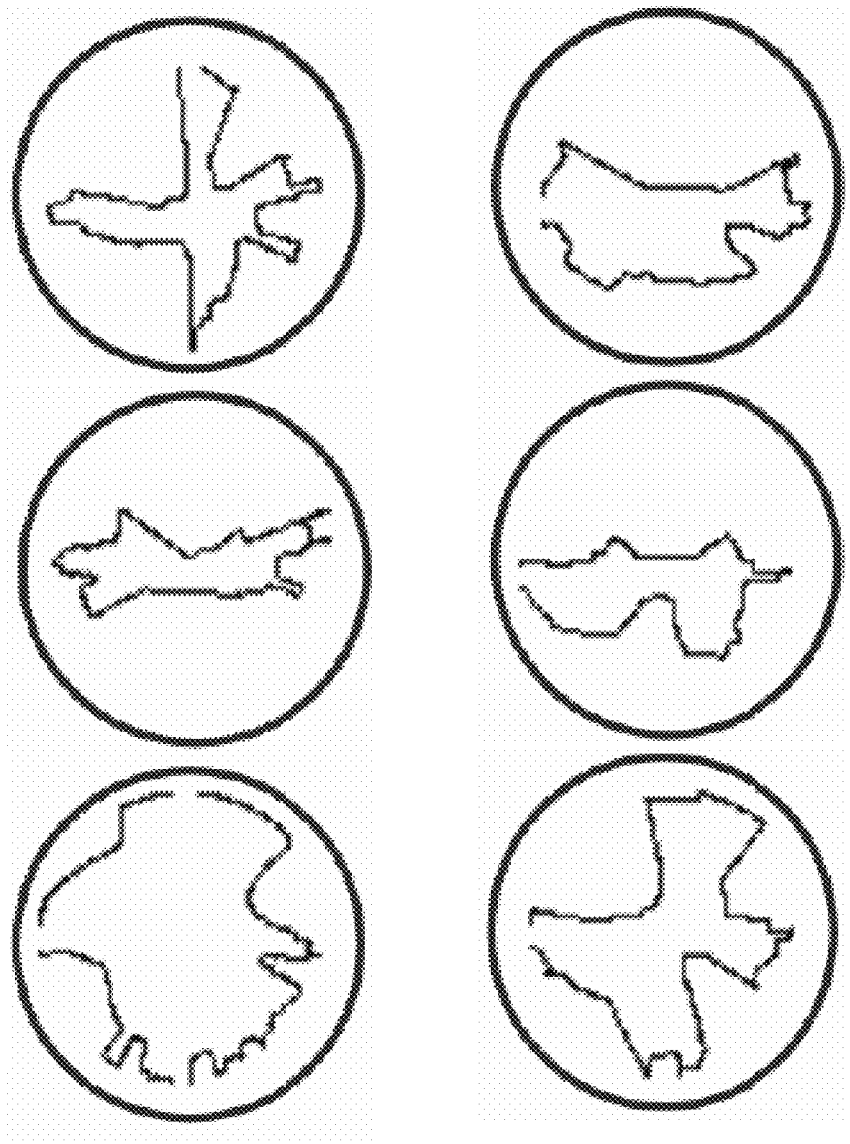
FIG. 4 are schematics of example skylines that can be extracted from virtual omni-images according to embodiments of the invention.

FIG. 4 shows example skylines that can be extracted from virtual omni-images.

Ray-calibrated view synthesis, as an advantage, does not introduce errors that would arise from using a parametric lens model. A very fast GPU pixel shader program generates these omni-images in real-time. Thus, even though we use image-based matching for whole-city localization, there is no database of images.

Sky Detection

Given an omni-image, we classify the pixels into sky pixels and not sky pixels. We use a discrete optimization approach, namely graph cuts, and a parameter learning module that maximizes discriminatory power given simple image features as input. Graph cuts are both fast, and used in many computer vision problems, such as stereo imaging, segmentation, and image restoration.

An energy function, involving binary variables in unary and pair-wise terms, is represented using a weighted graph. A minimum cut determined using a max-flow process yields an energy-minimizing partition of the variables.

We briefly described the energy function for which we learn parameters. Let $x_i \in \mathcal{B} = \{0, 1\}$, where $i=1, 2, \ldots, n$, represent Boolean random variables. In our method, each of these variables could represent Boolean labels, i.e., sky and not sky, of the pixels in the omni-image. We use quadratic pseudo-Boolean functions for representing our energy functions. These are energy functions of Boolean variables that map a Boolean vector to a real value, and thus are named pseudo-Boolean.

Let $\theta$ denote the parameters in our energy function. The parameter vector $\theta$ has unary terms $\theta_{i;\,a}$, and the pairwise terms $\theta_{ij;ab}$, where $i, j=1, 2, \ldots, n$ and $a, b \in \mathcal{B}$. These parameters are also referred to as unary and pair-wise potentials. We determine these parameters automatically.

The unary parameter $\theta_{i;\,a}$ is a pseudo-Boolean function $f\colon \mathcal{B} \Rightarrow \mathcal{R}$ that gives the cost when $x_i = a$. Similarly, a pairwise parameter $\theta_{ij;ab}$ is a quadratic pseudo-Boolean function $f\colon \mathcal{B}^2 \Rightarrow \mathcal{R}$ that gives the cost when $x_i = a$ and $x_j = b$. The function mapping partitions to energies is $$E(x \mid \theta) = \sum_{i \in V} \{\theta_{i;0}(1 - x_i) + \theta_{i;1}(x_i)\} + \sum_{(i,j) \in E} \{\theta_{ij;00}(1 - x_i)(1 - x_j) + \theta_{ij;01}(1 - x_i)x_j + \theta_{ij;10}x_i(1 - x_j) + \theta_{ij;11}x_ix_j\}. \tag{1}$$

We optimize the discriminating power of the model by automatically estimating parameters ($\theta$'s) to maximize the difference between ground truth labelings and all other labelings of a small number of manually labeled example images.

Our method is similar to a maximum-margin network learning method using graph cuts. We generate "nearmiss" labelings, and then estimate a parameter vector that maximizes the margin separating true labelings from the near misses in a convex optimization.

We obtain the unary likelihood for sky and not sky using color values. First, we estimate a Gaussian model for the class of sky pixels and the class of not sky pixels. We determine the mean and covariance of the Gaussian model using segmented ground truth images. For an input image, we obtain a unary likelihood by computing the Mahalanobis distance for the sky and non-sky classes.

Skyline Matching

After segmenting out the sky pixels in the omni-image, we match the segmented portion to synthesized virtual omni-images. Because the segmented image and the virtual omni-images are both high quality, a simple chamfer distance suffices to produce a score for the matching. During the chamfer matching, we vary the current pose parameters of our virtual omni-camera and synthesize new virtual skyline omni-images from the corresponding locations in the 3D model. A coarse pose can be obtained from a high scoring match using the method described below. By embedding the chamfer matching in a RANSAC framework, we can handle nontrivial occlusions, e.g. due to trees.

Figure 5A:
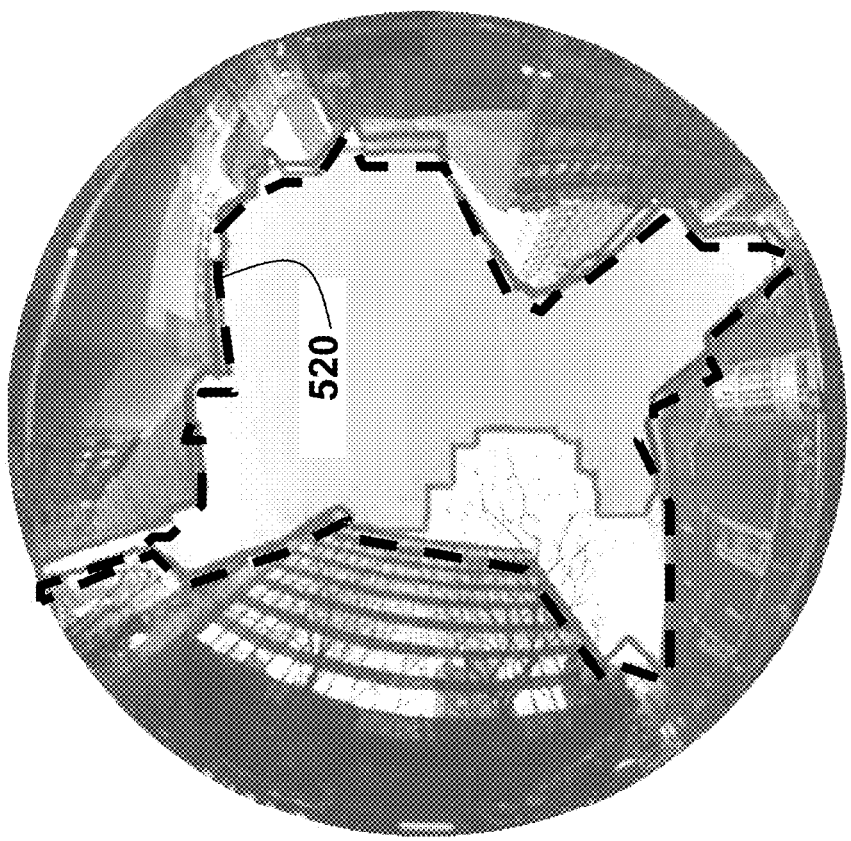
FIG. 5A is an image of failure modes of a skyline matching method in the presence of trees.
Figure 5B:
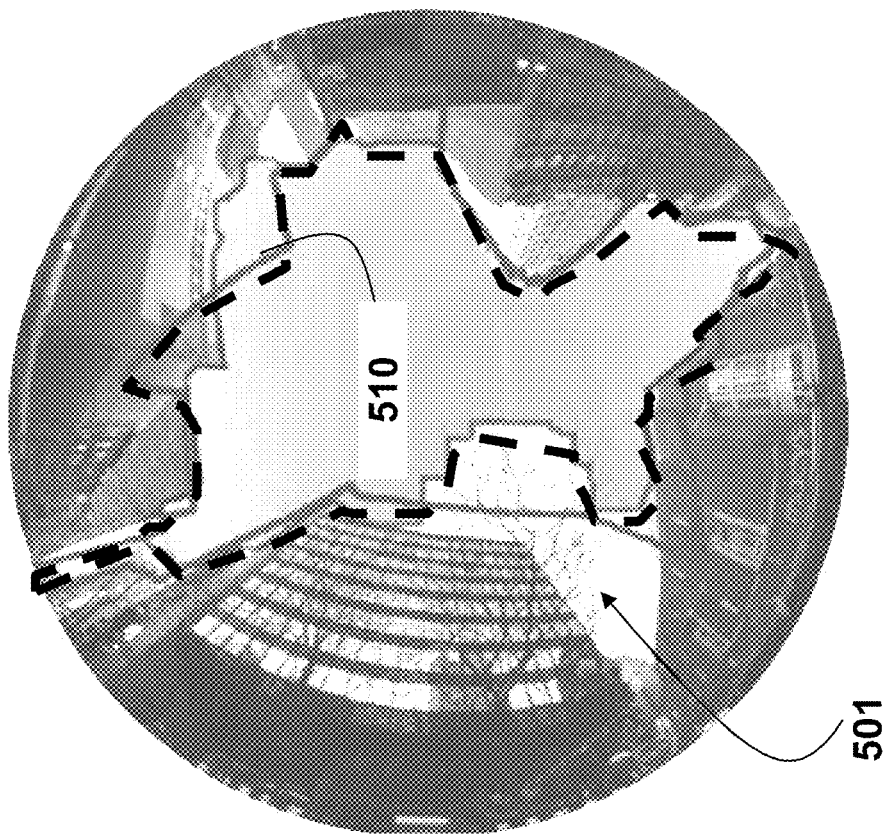
FIG. 5B is an image of a correct matching after embedding a skyline detection method in a RANSAC framework according to embodiments of the invention.

FIG. 5A shows the chamfer matching 510 with occlusion by trees 501. FIG. 5B shows the chamfer matching 520 embedded in the RANSAC framework.

Skyline Matching Using Shortest Path Procedure

When imaging conditions are very bad, such as during the night, the optimal graph cut has high energy, indicating a low-certainty segmentation. For these cases, we devised a segmentation free strategy in which predicted skyline images are directly compared to a sky-centric edge map derived from the input omni-image, yielding similarity scores. Although more compute-intensive, this approach appears to be more accurate. The main steps are shown in FIGS. 6A-6D and described below.

Figure 6B:
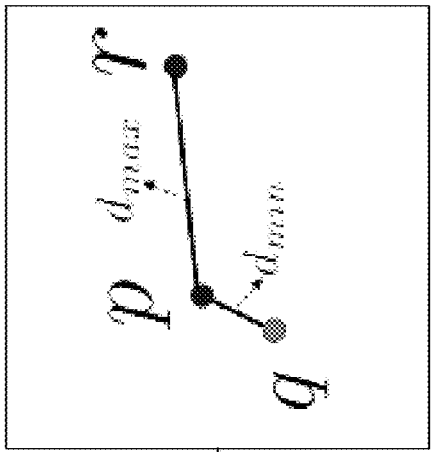
FIG. 6A-6D are schematics of a shortest path method for the skyline matching method according to embodiments of the invention.
Figure 6D:
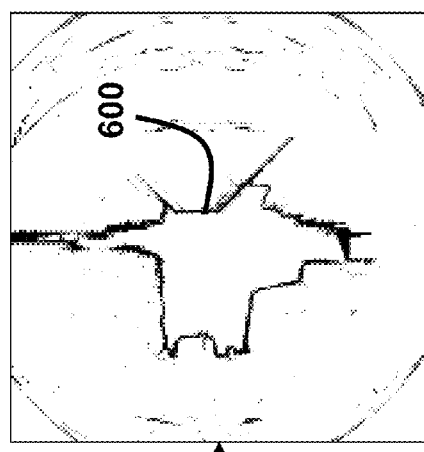
Figure 6A:
Figure 6C:
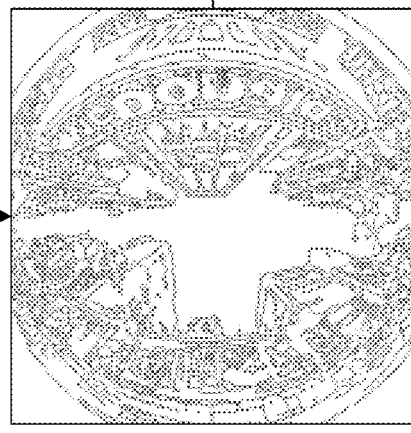

Edge-Map:

FIG. 6A shows an omni-image. As shown in FIG. 6B, we apply a thresholded Canny edge operator to the omni-image, and, for every pixel p, determine a ratio M of the distance $d_{max}$ to the farthest edge pixel r with respect to the distance $d_{min}$ nearest edge pixel q as $$M(p) = \frac{d_{max}}{d_{min}}. \quad (2)$$

The min-max operator highlights boundaries close to a large free space, in particular, the sky, while suppressing edge responses elsewhere. i.e., not sky.

Region of interest: A boundary in a virtual skyline omni-image is dilated to yield a tri-map: sky, not sky, and uncertain/not-sky, see FIG. 6C.

Match score: We use the Mortensen and W. Barrett intelligent scissors method to determine the matching cost, see U.S. Pat. No. 5,995,115, "Computer system process and user interface for providing intelligent scissors for image composition," incorporated herein by reference The basic idea is to construct a graph using nodes that correspond to pixels in the uncertain region. The edges connecting nodes have weights which are inversely proportional to the ratio M(p), so that strong max-min values induce smaller edge weights. We determine a circular shortest path inside the region of interest. The cost of the shortest path is proportional to the number of discontinuities.

In principle, a correct prediction detects a shortest path exactly on the skyline, which has zero cost. In practice, occlusions, inaccurate 3D models, discrete sampling issues in the search space, produce a non-zero shortest path cost. However, as shown in FIG. 6, a least cost and shortest path 600 is always very close to the actual skyline.

Fast Coarse Pose Using 2 Minimal Features

It is also possible to estimate a pose by comparing images of a previous skyline with a known pose and a current skyline. The idea is to use corresponding point or line features between the skylines and estimate a coarse pose for the current skyline. The use of two feature correspondences is sufficient to estimate a coarse pose. This requires a few reasonable assumptions.

First, we assume that the omni-camera is facing upward along the Z axis. Small misalignments can be corrected using vanishing points.

Second, we assume that the images are all taken at the same height. Any small variations are negligible compared to the height of the skyline. As a result there are only three degrees of freedom (3-DOF) between two consecutive images. A simple pose estimation procedure can be used to determine the 3-DOF between two consecutive images. Accordingly, the rotation matrices R and translation matrices T are:

$$R = \begin{pmatrix} R_{11} & R_{12} & 0 \\ -R_{12} & R_{11} & 0 \\ 0 & 0 & 1 \end{pmatrix} T = \begin{pmatrix} T_x \\ T_y \\ 0 \end{pmatrix}. \quad (3)$$

FIGS. 7A-7B show this process, beginning with a virtual skyline for the left image 7A. Our goal is to obtain a coarse location for the skyline in the right image 7B. Let $p_1$ and $q_1$ be two image pixels on the left image skyline. Let $p_2$, $q_2$ be the corresponding matching pixels in the right image.

The 3D points corresponding to $p_i$ and $q_i$, denoted P and Q in the FIG. 7A, are known from the skyline matching in the left image. Thus, we have 3D-2D correspondences between the 3D model and some pixels in the right image.

The correspondences are used to determine the pose: As shown in FIG. 7B, the following are all collinear:

the camera center for the right image $C_2$;

a point on the projection ray of $p_2$ given by $C_2 + \vec{d}_2$; and the 3D point P.

Using the homography, we determine that any 3×3 submatrix of the following has a zero determinant:

$$\begin{pmatrix} C_{2x} & C_{2x} + \vec{d}_{2x} & R_{11}P_x + R_{12}P_y + T_x \\ C_{2y} & C_{2y} + \vec{d}_{2y} & -R_{12}P_x + R_{11}P_y + T_y \\ C_{2z} & C_{2z} + \vec{d}_{2z} & P_z \\ 1 & 1 & 1 \end{pmatrix}. \quad (4)$$

We obtain four equations by removing one row at a time, two of which are independent.

By using the collinearity constraint for the second point Q, we can obtain two other equations. Using these equations, it is straight forward to determine the XY-plane translations and rotation between the two images.

Similarly, it is possible to identify two coplanarity constraints from a single line correspondence. Let $L_1$ and $L_2$ be two 3D points on a line in space. The 3D coordinates of these points are already known from the skyline match of the left image. As a result, the following are coplanar:

the second camera center $C_2$;

two points on the projection rays $(C_2 + \vec{d}_1, C_2 + \vec{d}_2)$;

two arbitrary 3D points $L_1$ and $L_2$.

This results in two coplanarity constraints using the quadruplets $[C_2, C_2 + \vec{d}_1, C_2 + \vec{d}_2, L_1]$, and $[C_2, C_2 + \vec{d}_1, C_2 + \vec{d}_2, L_2]$, respectively.

We summarize this in a matrix whose 3×3 submatrices have zero determinant. For the first quadruplet, the matrix is:

$$= \begin{pmatrix} C_{2x} & C_{2x}+\vec{d}_{1x} & C_{2x}+\vec{d}_{2x} & R_{11}L_{1x}+R_{12}L_{1y}+T_x \\ C_{2y} & C_{2y}+\vec{d}_{1y} & C_{2y}+\vec{d}_{2y} & -R_{12}L_{1x}+R_{11}L_{1y}+T_y \\ C_{2z} & C_{2z}+\vec{d}_{1z} & C_{2z}+\vec{d}_{2z} & L_{1z} \\ 1 & 1 & 1 & 1 \end{pmatrix} \quad (5)$$

and similarly for the second quadruplet. In the same way, we can obtain two equations from the second 3D line $M_1M_2$.

It is possible to obtain the coarse pose from just two feature correspondences:

2 points;
2 lines; and
1 point and 1 line.
Degeneracy Cases
Underlying Connections to 2D-3D Registration Skyline based geo-localization is essentially a 2D-3D registration using points and lines that are disguised in a piecewise nonlinear curve in omni-images. If one realizes this connection, then the technique described for our coarse pose estimation governs the limitations and degeneracies of our method. The degenerate cases are:

less than two distinct points on the whole skyline;
only one line with no distinct point in the skyline;
only two parallel lines with no distinct points.

However, such scenes are highly improbable in urban environments.

Obtaining a correct 2D-3D correspondence is an NP-hard problem and therefore we improve our method. In our setting, better shape matching procedures can improve accuracy.

EFFECT OF THE INVENTION

Existing methods for geo-localization use either Simultaneous Localization And Mapping (SLAM), or recognition based techniques. The invention extends both of those techniques, and formulates the geo-localization problem as an image-based shape matching task. This enables us to apply accurate discrete optimization and shape matching results to the geo-localization problem.

With our method, it possible to outperform GPS measurements in urban canyons, which are known to be extremely problematic for commercial GPS units. Other advantages of our skylines-based is easy recognition due the presence of open space or blue sky, fewer occlusions from street signs, pedestrians, and vehicles.

Our method can also be used to perform change detection in the scene. Any changes in the scene with respect to the 3D model can be determined while matching the skylines. Mismatch in some part of the skyline, when the rest matches indicates changes in the scene like missing or altered buildings.

We can localize to within 2 meters. To improve the localization to a few centimeters, we can use other vision features: vanishing points, interest point matching and tracking between consecutive frames, SLAM procedures, and even priors learned from image databases.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for determining a location and orientation in an environment, comprising, a processor for performing steps of the method, comprising the steps of:
   acquiring a set of one or more real omni-directional images of an unknown skyline in the environment from an unknown location and an unknown orientation in the environment by an omni-directional camera;
   synthesizing a set of virtual omni-directional images from a 3D model of the environment, wherein each virtual omni-directional image is associated with a known skyline, a known location and a known orientation; and
   comparing each real omni-directional image with each virtual omni-directional images to determine a best matching virtual omni-directional image with the associated known location and known orientation that correspond to the unknown location and orientation, wherein the steps are performed in a processor.

2. The method of claim 1, wherein the synthesizing is performed in real-time in a pixel shader program of a graphics processing unit.

3. The method of claim 1, further comprising:
   applying a graph cut procedure to the real omni-directional image to determine a real skyline.

4. The method of claim 1, wherein the comparing uses a chamfer distance.

5. The method of claim 4, wherein the chamfer distance determination is embedded in a RANdom SAmple Consensus framework.

6. The method of claim 1, further comprising
   estimating an initial pose using only two features.

7. The method of claim 1, wherein the location is determined using a max-min operator, and a shortest path procedure.

8. The method of claim 1, wherein the synthesizing uses ray-mapping.

9. The method of claim 1, further comprising:
   classifying pixels in the real omni-directional image as sky or not sky based on color of the pixels.

10. The method of claim 1, further comprising: identifying missing buildings in the scene.

11. The method of claim 1, further comprising: identifying changes in the scene.

12. The method of claim 6, wherein the two features are 2 points, 2 lines, or 1 point and 1 line.

13. The method of claim 1, wherein the omni-directional camera is mobile and the set of one or more images is a temporal sequence of images.

14. The method of claim 13, further comprising:
   navigating through the environment according to the known locations and known orientations.

15. A system for determining a location and orientation in an environment, comprising:
   an omni-directional camera configured to acquire a set of one or more real omni-directional images of an unknown skyline in the environment from an unknown location and an unknown orientation in the environment by an omni-directional camera;
   means for synthesizing a set of virtual omni-directional images from a 3D model of the environment, wherein each virtual omni-directional image is associated with a known skyline, a known location and a known orientation; and means for comparing each real omni-directional image with each virtual omni-directional images to determine a best matching virtual omni-directional image with the associated known location and known orientation that correspond to the unknown location and orientation, wherein the steps are performed in a camera.

* * * * *